United States Patent
Matsumoto et al.

(10) Patent No.: US 11,816,839 B2
(45) Date of Patent: Nov. 14, 2023

(54) REGION EXTRACTION MODEL LEARNING APPARATUS, REGION EXTRACTION MODEL LEARNING METHOD, AND PROGRAM

(71) Applicant: NIPPON TELEGRAPH AND TELEPHONE CORPORATION, Tokyo (JP)

(72) Inventors: Ayumi Matsumoto, Tokyo (JP); Dan Mikami, Tokyo (JP); Hideaki Kimata, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 261 days.

(21) Appl. No.: 15/734,443

(22) PCT Filed: May 20, 2019

(86) PCT No.: PCT/JP2019/019831
§ 371 (c)(1),
(2) Date: Dec. 2, 2020

(87) PCT Pub. No.: WO2019/235192
PCT Pub. Date: Dec. 12, 2019

(65) Prior Publication Data
US 2021/0224590 A1 Jul. 22, 2021

(30) Foreign Application Priority Data
Jun. 6, 2018 (JP) .................................. 2018-108662

(51) Int. Cl.
*G06T 7/11* (2017.01)
*G06T 7/30* (2017.01)
(Continued)

(52) U.S. Cl.
CPC .............. *G06T 7/11* (2017.01); *G06F 18/214* (2023.01); *G06F 18/217* (2023.01); *G06N 20/00* (2019.01);
(Continued)

(58) Field of Classification Search
CPC .... G06K 9/6256; G06V 10/267; G06V 10/26; G06V 40/103; G06T 2207/30196;
(Continued)

(56) References Cited

U.S. PATENT DOCUMENTS 9,721,148 B2 * 8/2017 Ganong ............... G06V 40/172
10,540,757 B1 * 1/2020 Bouhnik ................... G06T 7/37
(Continued)

FOREIGN PATENT DOCUMENTS

JP    2014178957 A    9/2014

OTHER PUBLICATIONS

Balakrishnan et al., Synthesizing Images of Humans in Unseen Poses, Apr. 20, 2018, ARXIV.org (Year: 2018).*
(Continued)

*Primary Examiner* — Gandhi Thirugnanam

(57) ABSTRACT

Provided is technology for extracting a person region from an image, that can suppress preparation costs of learning data. Included are a composited learning data generating unit that generates, from already-existing learning data that is a set of an image including a person region and a mask indicating the person region, and a background image to serve as a background of a composited image, composited learning data that is a set of a composited image and a compositing mask indicating a person region in the composited image, and a learning unit that learns model parameters using the composited learning data. The composited learning data generating unit includes a compositing parameter generating unit that generates compositing parameters
(Continued)

that are a set of an enlargement factor, a degree of translation, and a degree of rotation, using the mask of the learning data, and a composited image and compositing mask generating unit that extracts a compositing person region from an image in the learning data using a mask of the learning data, generates the composited image from the background image and the compositing person region, using the compositing parameters, generates the compositing mask from a mask generating image and the compositing person region that are the same size as the composited image, using the compositing parameters, and generates the composited learning data.

20 Claims, 12 Drawing Sheets

(51) Int. Cl.
```
G06T 7/70      (2017.01)
G06N 20/00     (2019.01)
G06V 40/10     (2022.01)
G06F 18/214    (2023.01)
G06F 18/21     (2023.01)
G06V 10/26     (2022.01)
```
(52) U.S. Cl.
CPC ................. *G06T 7/30* (2017.01); *G06T 7/70* (2017.01); *G06V 10/267* (2022.01); *G06V 40/103* (2022.01); *G06T 2207/20081* (2013.01); *G06T 2207/20212* (2013.01); *G06T 2207/30196* (2013.01)

(58) Field of Classification Search
CPC .. G06T 7/01; G06T 7/194; G06T 7/30; G06T 7/70; G06T 2207/20212; G06T 2207/20221; G06T 11/60; G06T 2207/20084; G06T 2207/20081
See application file for complete search history.

(56) References Cited

U.S. PATENT DOCUMENTS

| | | |
|---|---|---|
| 2017/0039867 A1* | 2/2017 | Fieldman ................. G09B 7/00 |
| 2019/0122073 A1* | 4/2019 | Ozdemir ................ G06V 20/56 |
| 2021/0117731 A1* | 4/2021 | Kawai ..................... G06T 7/194 |
| 2021/0224590 A1* | 7/2021 | Matsumoto .......... G06V 40/103 |

OTHER PUBLICATIONS

Ronneberger et al. (2015) "U-Net: Convolutional Networks for Biomedical Image Segmentation" MICCAI vol. 9351 pp. 234-241.
Zheng et al. (2015) "Conditional Random Fields as Recurrent Neural Networks" International Conference on Computer Vision (ICCV) pp. 1529-1537.
The PASCAL Visual Object Classes Homepage, May 23, 2018 (Reading Day) Web Page: http://host.robots.ox.ac.uk/pascal/VOC/.
Kikuchi et al. (2017) "Semantic Human Image Parsing Using CNN Incorporating Pose Information and Augmenting Background Images" Visual Computing Graphics and CAD Joint Symposium draft collection, pp. 30-37.

* cited by examiner (A) ACQUIRE JOINT POSITIONS (B) GENERATE PERSON REGION

REGION EXTRACTION MODEL LEARNING APPARATUS, REGION EXTRACTION MODEL LEARNING METHOD, AND PROGRAM

CROSS-REFERENCE TO RELATED APPLICATIONS

This application is a U.S. 371 Application of International Patent Application No. PCT/JP2019/019831, filed on 20 May 2019, which application claims priority to and the benefit of JP Application No. 2018-108662, filed on 6 Jun. 2018, the disclosures of which are hereby incorporated herein by reference in their entireties.

TECHNICAL FIELD

The present invention relates to a technology for extracting a region including a person from an image.

BACKGROUND ART

Technology for extracting a region including a person (hereinafter referred to as person region) from an image is called semantic segmentation and in recent years much research using deep learning in particular has been done (NPL 1, NPL 2). A great number of pieces of learning data, which is a set of an image and a mask indicating a person region included in the image, needs to be prepared in advance for semantic segmentation using deep learning. As of recent, a learning database where learning data used for deep learning (e.g., NPL 3) is accumulated is being organized, and precision of region extraction through deep learning is improving by using such learning databases.

CITATION LIST

Non Patent Literature

[NPL 1] Olaf Ronneberger, et al., "U-Net: Convolutional Networks for Biomedical Image Segmentation", MICCAI 2015, Springer, Lecture Notes in Computer Science, vol. 9351, pp. 234-241, 2015.
[NPL 2] Shuai Zheng, et al., "Conditional Random Fields as Recurrent Neural Networks", International Conference on Computer Vision (ICCV) 2015, pp. 1529-1537, 2015.
[NPL 3] The PASCAL Visual Object Classes Homepage, [online], [Searched May 23, 2018], Internet <URL: http://host.robots.ox.ac.uk/pascal/VOC/>

SUMMARY OF THE INVENTION

Technical Problem

However, progress in accumulating learning data has been insufficient for images including regions of persons in unusual poses, as in sports videos, and there is a problem in that sufficient extraction precision cannot be obtained by deep learning using already-existing learning databases. This problem can be solved by separately and additionally preparing learning data other than learning data obtained from a learning database, and performing learning, but preparation of this learning data is costly. Particularly, the backgrounds are preferably the same in images that are elements of learning data and images that are the object of extracting processing using a trained model in order to further improve extraction precision, but preparing such learning data would be prohibitively costly. This will be described by way of an example of baseball. In a case of preparing, as learning data, an image of a pitching scene to be used for extracting a region of a pitcher in a pitching scene, it is desirable to prepare as many as possible images taken of a person wearing a particular uniform and assuming a pitching pose, with the camera directed from the batter's box side toward the pitcher's mound in a stadium that is the object of extracting processing. However, this preparatory work is extremely effort-consuming.

Accordingly, it is an object of the present invention to provide a technology for extracting person regions from images, where preparation costs for learning data can be suppressed.

Means for Solving the Problem

A region extraction model learning device according to an aspect of the present invention includes a composited learning data generating unit that generates, from already-existing learning data that is a set of an image including a person region and a mask indicating the person region, and a background image to serve as a background of a composited image, composited learning data that is a set of a composited image and a mask indicating a person region in the composited image (hereinafter referred to as compositing mask), and a learning unit that learns model parameters using the composited learning data. The composited learning data generating unit includes a compositing parameter generating unit that generates compositing parameters that are a set of an enlargement factor whereby a person region is enlarged/reduced, a degree of translation by which to translate the person region, and a degree of rotation by which to rotate the person region, using the mask of the learning data, and a composited image and compositing mask generating unit that extracts a person region from an image in the learning data (hereinafter referred to as compositing person region) using a mask of the learning data, generates the composited image from the background image and the compositing person region, using the compositing parameters, generates the compositing mask from a mask generating image and the compositing person region that are the same size as the composited image, using the compositing parameters, and generates the composited learning data.

A region extraction model learning device according to an aspect of the present invention includes a composited learning data generating unit that generates, from already-existing learning data that is a set of an image including a person region and a mask indicating the person region, and a background image to serve as a background of a composited image, composited learning data that is a set of a composited image and a mask indicating a person region in the composited image (hereinafter referred to as compositing mask), and a learning unit that learns model parameters using the composited learning data. The composited learning data generating unit includes a compositing parameter generating unit that generates compositing parameters that are a set of an enlargement factor whereby a person region is enlarged/reduced, a degree of translation by which to translate the person region, and a degree of rotation by which to rotate the person region, using the mask of the learning data, a composited image generating unit that extracts a person region from an image in the learning data (hereinafter referred to as compositing person region) using a mask of the learning data, and generates the composited image from the background image and the compositing person region using the compositing parameters, and a compositing mask generating unit that generates the compositing mask from a mask generating image that is the same size as the composited image, using the composited image, and generates the composited learning data.

Effects of the Invention

According to the present invention, a region extraction model used to extract person regions from images can be learned using learning data generated while suppressing preparation costs.

DESCRIPTION OF EMBODIMENTS

Embodiments of the present invention will be described in detail below. Note that configurations having the same functions are denoted by the same numerals, and repetitive description will be omitted.

First Embodiment

Figure 1:
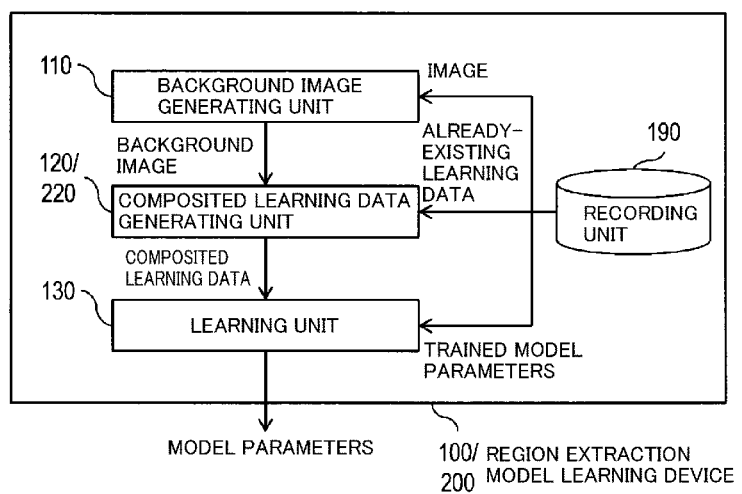
FIG. 1 is a block diagram illustrating a configuration of a region extraction model learning device 100/200.
Figure 2:
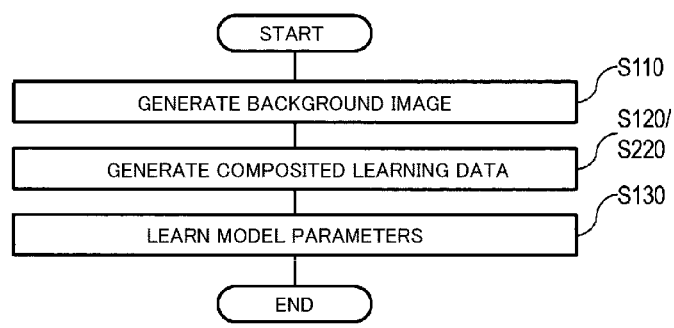
FIG. 2 is a flowchart illustrating operations of the region extraction model learning device 100/200.

A region extraction model learning device 100 will be described below with reference to FIG. 1 and FIG. 2. FIG. 1 is a block diagram illustrating a configuration of the region extraction model learning device 100. FIG. 2 is a flowchart illustrating operations of the region extraction model learning device 100. The region extraction model learning device 100 includes a background image generating unit 110, a composited learning data generating unit 120, a learning unit 130, and a recording unit 190, as illustrated in FIG. 1. The recording unit 190 is a component that records, as appropriate, information necessary for processing by the region extraction model learning device 100. The recording unit 190 records, for example, already-existing learning data, and trained model parameters that have been learned using this learning data. The already-existing learning data here is a set of an image including a person region and a mask indicating this person region. A mask is a binary image of the same size as the image including the person region, where the person region is white and the rest is black, for example, and serves as correct answer data (an image indicating a correct answer region). The trained model parameters are model parameters learned by deep learning according to NPL 1, NPL 2, or the like. The recording unit 190 also records an image that is a candidate for a background image, for example. The background image is an image to serve as the background of a composited image, which is an element of the composited learning data, and is an image that does not include a person therein. Note that the background in the background image preferably is the same background as that of an image that is the object of processing (processing-object image) from which a later-described region extracting device 300 extracts a person region. The image to serve as a candidate for the background image may be read into the region extraction model learning device 100 in advance, or may be read into the region extraction model learning device 100 in real time using a camera.

Operations of the region extraction model learning device 100 will be described below with reference to FIG. 2.

In S110, the background image generating unit 110 takes, as input, an image recorded in the recording unit 190 to serve as a candidate for the background image, generates a background image from this image, and outputs the generated background image. In a case where there is a plurality of images that do not include a person therein in images to serve as candidates for the background image, one of these may be taken as the background image. Further, an image serving as a candidate for the background image may be used as the background image without change, or may be subjected to adjustment, such as resizing to an appropriate size or the like, and then used as the background image.

Figure 3:
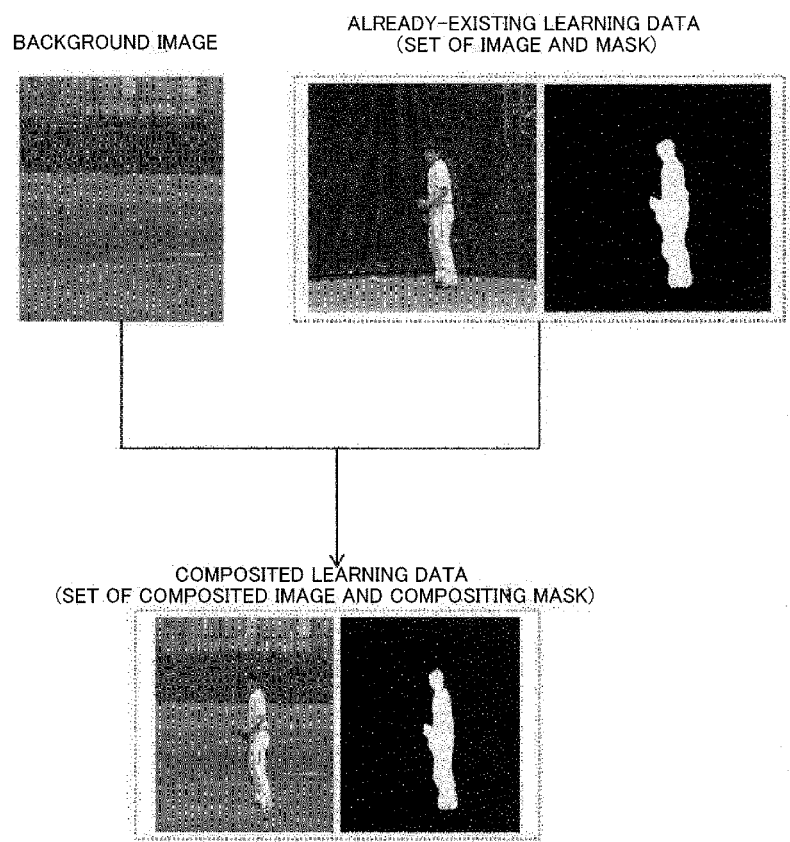
FIG. 3 is a diagram for describing composited learning data.

In S120, the composited learning data generating unit 120 takes already-existing learning data recorded in the recording unit 190 and the background image generated in S110 as input, generates, from the already-existing learning data and the background image, composited learning data that is a set of a composited image and a mask indicating a person region in the composited image (hereinafter referred to as a compositing mask), and outputs the generated composited learning data. FIG. 3 is a diagram for describing composited learning data.

Figure 4:
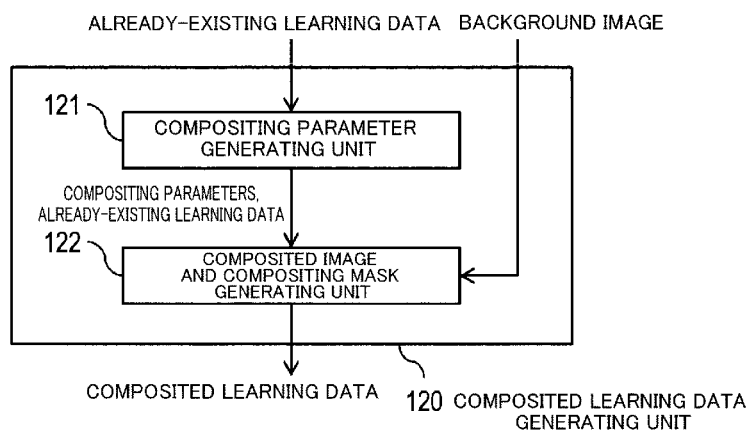
FIG. 4 is a block diagram illustrating a configuration of a composited learning data generating unit 120.
Figure 5:
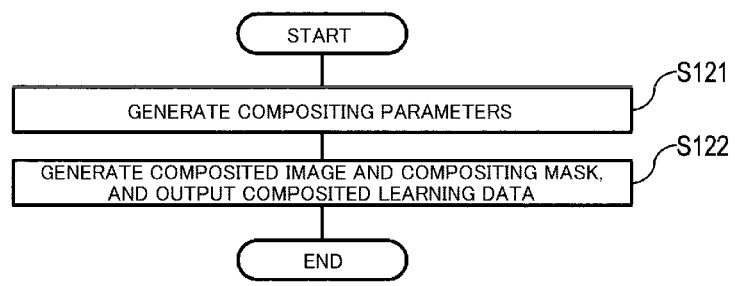
FIG. 5 is a flowchart illustrating operations of the composited learning data generating unit 120.

The composited learning data generating unit 120 will be described below with reference to FIG. 4 and FIG. 5. FIG. 4 is a block diagram illustrating a configuration of the composited learning data generating unit 120. FIG. 5 is a flowchart illustrating operations of the composited learning data generating unit 120. The composited learning data generating unit 120 includes a compositing parameter generating unit 121 and a composited image and compositing mask generating unit 122, as illustrated in FIG. 4.

Operations of the composited learning data generating unit 120 will be described below with reference to FIG. 5.

In S121, the compositing parameter generating unit 121 takes already-existing learning data recorded in the recording unit 190 as input, generates compositing parameters using a mask that is an element of the already-existing learning data, and outputs the compositing parameters and the already-existing learning data. The compositing parameters are a set of an enlargement factor whereby a person region is enlarged/reduced, a degree of translation by which to translate the person region, and a degree of rotation by which to rotate the person region. This will be described in detail below.

The enlargement factor is a predetermined rate by which the number of pixels of the person region in the horizontal direction and vertical direction is multiplied, and may be selected from a range of 0.9 to 1.1, for example. In a case where the enlargement factor is 1.0, for example, the person region will be composited with the background image without changing the size thereof. If the enlargement factor is 0.9, the size of the person region will be reduced. Note that the enlargement factor is applied according to a predetermined method (e.g., having fixed the lower edge of the person region (the edge of a region around the feet of the person)). That is to say, a composited image where the enlarged/reduced person region is composited with the background image is generated by applying the enlargement factor to the person region according to a predetermined method. Also, a plurality of enlargement factors is preferably generated. Further, the generated enlargement factors preferably include 1.0.

The degree of translation is the number of pixels by which to move the person region in the horizontal direction and/or vertical direction. That is to say, the degree of translation may be the number of pixels by which to move the person region in the horizontal direction, or may be the number of pixels by which to move the person region in the vertical direction, or may be a set of the number of pixels by which to move the person region in the horizontal direction and the number of pixels by which to move the person region in the vertical direction. With regard to the number of pixels by which to move in the horizontal direction, an arrangement may be made wherein in a case where the pitcher's plate is in the image that is an element of the already-existing learning data for example, the number of pixels corresponding to the long side of the pitcher's plate, detected by image processing, is obtained, and a value where this number of pixels is multiplied by a predetermined rate $\gamma$ ($0 \leq |\gamma| \leq 1$) is used. In a case where this value is not an integer, a value where this has been rounded off as appropriate may be used. For example, if the degree of translation in the horizontal direction is set to 0, the person region will be composited with the background image without the position thereof being moved to the left or right. Also, in a case where the pitcher's plate is not in the image, an arrangement may be made where the number of pixels equivalent to the length of the long side of the pitcher's plate (approximately 40 cm) is obtained, and a value where this number of pixels is multiplied by the predetermined rate $\gamma$ ($0 \leq |\gamma| \leq 1$) is used. With regard to a set of the number of pixels by which to move in the horizontal direction and the number of pixels by which to move in the vertical direction, a set of a value where the number of pixels of the person region in the horizontal direction is multiplied by a predetermined rate $\gamma_1$ ($0 \leq |\gamma_1| \leq 1$) and a value where the number of pixels of the person region in the vertical direction is multiplied by a predetermined rate $\gamma_2$ ($0 \leq |\gamma_2| \leq 1$) may be used, for example. Note that the degree of translation is applied with a predetermined position as a reference (e.g., with the position where the left side and lower side of the person region intersect as a reference). That is to say, a composited image where the translated person region has been composited with the background image is generated by applying the degree of translation to the person region with a predetermined position as a reference. Also, a plurality of degrees of translation is preferably generated. Further, values indicating no translation such as "0 in horizontal direction", "0 in vertical direction", "0 in horizontal direction, 0 in vertical direction" are preferably included as the degrees of translation to be generated.

The degree of rotation is the angle by which the person region is tilted, and may be selected from a range of $-10°$ to $10°$, for example. For example, if the degree of rotation is 0°, the person region will be composited with the background image without being tilted. Note that the degree of rotation is applied with a predetermined position (e.g., with the center of the lower edge of the person region (the edge of a region around the feet of the person)) as the center of rotation. That is to say, a composited image where the rotated person region is composited with the background image is generated by applying the degree of rotation to the person region with a predetermined position as the center of rotation. Also, a plurality of degrees of rotation is preferably generated. Further, the generated degrees of rotation preferably include 0°.

In a case of generating N ($N \geq 1$) compositing parameters, N composited images can be generated from a set of one background image and one person region. N that indicates the number of compositing parameters preferably is at least 10, around 100 for example. Also, three or more are preferably generated for each of enlargement factor, degree of translation, and degree of rotation. Accordingly, in a case of generating around 100 compositing parameters, five, five, and four may be respectively generated for enlargement factor, degree of translation, and degree of rotation, with these being combined to generate 100 compositing parameters. Alternatively six, six, and three may be respectively generated for enlargement factor, degree of translation, and degree of rotation, with these being combined to generate 108 compositing parameters.

In S122, the composited image and compositing mask generating unit 122 takes, as input, the background image generated in S110, the already-existing learning data output in S121, and the compositing parameters generated in S121, and extracts a person region from the image that is an element of the already-existing learning data (hereinafter referred to as compositing person region), using a mask that is an element of the already-existing learning data. The composited image and compositing mask generating unit 122 generates a composited image from the background image and compositing person region using the compositing parameters. The composited image and compositing mask generating unit 122 generates a compositing mask from a mask generating image and compositing person region that are the same size as the composited image, using the compositing parameters. The composited image and compositing mask generating unit 122 generates composited learning data, which is a set of the composited image and the compositing mask, and outputs the generated composited learning data. Any compositing method may be used for generating of the composited image. The mask generating image used for generating the compositing mask is a solid-black monochrome image (an image obtained by converting each pixel in the composited image to black), for example. Also, the compositing mask is generated by compositing a region obtained by converting each pixel of the compositing person region into white with the mask generating image, for example. Any compositing method may be used for generating the compositing mask, and for example, the same method as that for generating the composited image may be used.

In S130, the learning unit 130 takes trained model parameters recorded in the recording unit 190 and the composited learning data generated in S120 as input, learns (i.e., updates) the model parameters (region extraction model) using the composited learning data, and outputs the learned model parameters. Trained model parameters are used as the initial values of the model parameters at the time of learning. Also, for the learning method, the same method as that of learning using the already-existing learning data is used. Specifically, model parameters are learned (updated) using a loss function L(p) (p represents pixels) defined on the basis of error between the person region extracted from the composited image and the person region in the compositing mask, using the model parameters being learned, such that the values thereof decrease, for example. Also, the model parameters may be learned (updated) using the weighted loss function $L_w(p)$ defined in the following Expression.

$$L_w(p)=\alpha(1+M(p))L(p) \quad \text{[Formula 1]}$$

M(p) here is a function that is 1 in the person region and 0 at all other regions. Also, α is a predetermined positive value, and preferably is a value larger than 0.5. α is a parameter that controls the influence of the person region, and has a characteristic in that the greater the value thereof is, the greater the influence of the person region is.

Note that randomly-generated values may be used as the initial values of the model parameters, instead of using trained model parameters. In this case, there is no need for the recording unit 190 to record trained model parameters, and only the composited learning data generated in S120 is input to the learning unit 130.

According to the invention of the present embodiment, a region extraction model used for extracting a person region from an image can be learned using learning data generated while suppressing preparation costs.

Second Embodiment

A region extraction model learning device 200 will be described below with reference to FIG. 1 and FIG. 2. FIG. 1 is a block diagram illustrating a configuration of the region extraction model learning device 200. FIG. 2 is a flowchart illustrating operations of the region extraction model learning device 200. The region extraction model learning device 200 includes the background image generating unit 110, a composited learning data generating unit 220, the learning unit 130, and the recording unit 190, as illustrated in FIG. 1. The recording unit 190 is a component that records, as appropriate, information necessary for processing by the region extraction model learning device 200. The recording unit 190 records, for example, already-existing learning data, and trained model parameters that have been learned using this learning data. The recording unit 190 records an image that is a candidate for a background image, for example.

The region extraction model learning device 200 differs from the region extraction model learning device 100 with regard to the point of including the composited learning data generating unit 220 instead of the composited learning data generating unit 120.

Operations of the region extraction model learning device 200 will be described below with reference to FIG. 2.

In S110, the background image generating unit 110 takes, as input, an image recorded in the recording unit 190 to serve as a candidate for the background image, generates a background image from this image, and outputs the generated background image.

In S220, the composited learning data generating unit 220 takes already-existing learning data recorded in the recording unit 190 and the background image generated in S110 as input, generates a composited image from the already-existing learning data and the background image, and composited learning data that is a set of the composited image and a mask indicating a person region in the composited image (hereinafter referred to as a compositing mask), and outputs the generated composited learning data.

Figure 6:
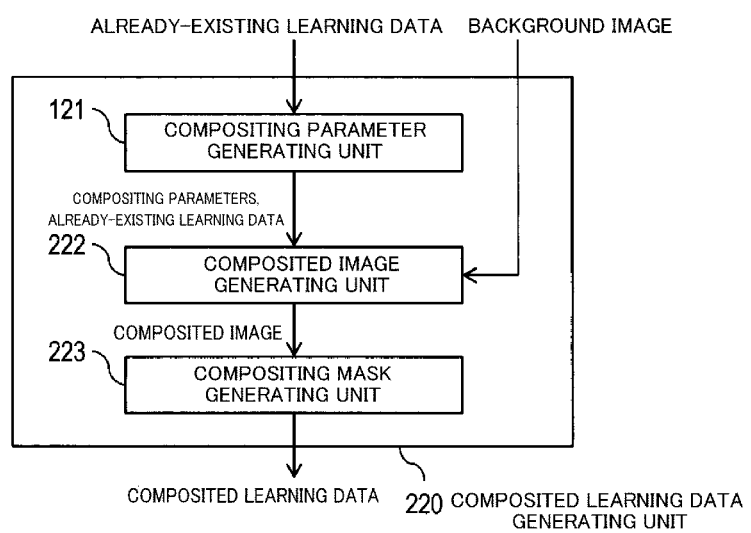
FIG. 6 is a block diagram illustrating a configuration of a composited learning data generating unit 220.
Figure 7:
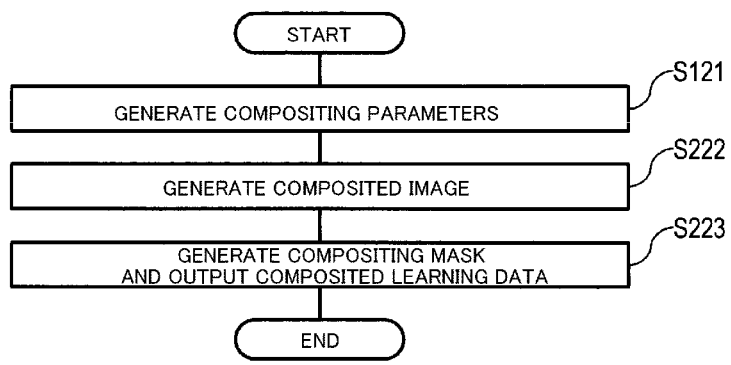
FIG. 7 is a flowchart illustrating operations of the composited learning data generating unit 220.

The composited learning data generating unit 220 will be described below with reference to FIG. 6 and FIG. 7. FIG. 6 is a block diagram illustrating a configuration of the composited learning data generating unit 220. FIG. 7 is a flowchart illustrating operations of the composited learning data generating unit 220. The composited learning data generating unit 220 includes the compositing parameter generating unit 121, a composited image generating unit 222, and a compositing mask generating unit 223, as illustrated in FIG. 6.

Operations of the composited learning data generating unit 220 will be described below with reference to FIG. 7.

In S121, the compositing parameter generating unit 121 takes already-existing learning data recorded in the recording unit 190 as input, generates compositing parameters using a mask that is an element of the already-existing learning data, and outputs the compositing parameters and the already-existing learning data.

In S222, the composited image generating unit 222 takes, as input, the background image generated in S110, the already-existing learning data output in S121, and the compositing parameters generated in S121, and extracts a person region from the image that is an element of the already-existing learning data (hereinafter referred to as compositing person region), using a mask that is an element of the already-existing learning data. The composited image generating unit 222 generates a composited image from the background image and the compositing person region, using the compositing parameters, and outputs the generated composited image. Generating of the composited image may be the same as in S122.

In S223, the compositing mask generating unit 223 takes the composited image generated in S222 as input, and generates a compositing mask from a mask generating image that is the same size as the composited image, using the composited image. The compositing mask generating unit 223 generates composited learning data, which is a set of the composited image and the compositing mask, and outputs the generated composited learning data.

Figure 8:
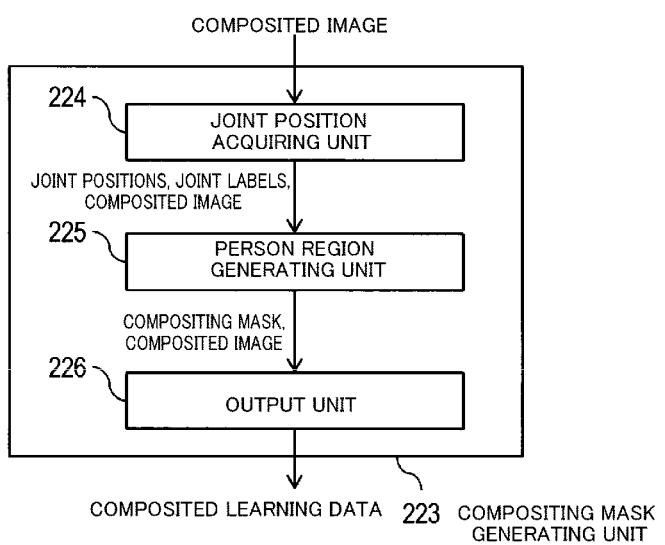
FIG. 8 is a block diagram illustrating a configuration of a compositing mask generating unit 223.
Figure 9:
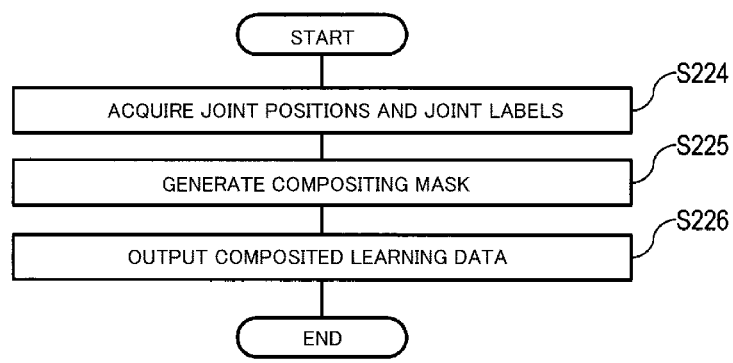
FIG. 9 is a flowchart illustrating operations of the compositing mask generating unit 223.

The compositing mask generating unit 223 will be described below with reference to FIG. 8 and FIG. 9. FIG. 8 is a block diagram illustrating a configuration of the compositing mask generating unit 223. FIG. 9 is a flowchart illustrating operations of the compositing mask generating unit 223. The compositing mask generating unit 223 includes a joint position acquiring unit 224, a person region generating unit 225, and an output unit 226, as illustrated in FIG. 8.

Figure 10:
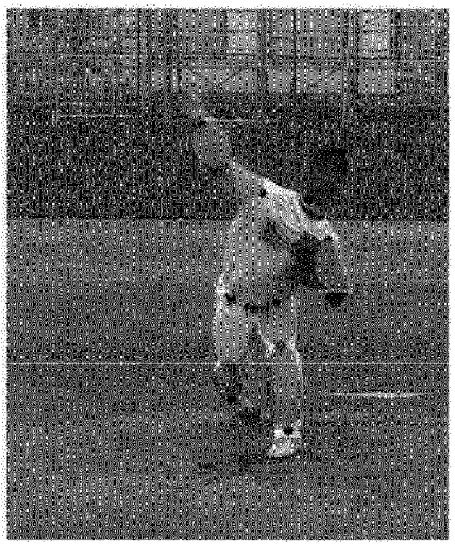
FIG. 10 is a diagram illustrating the way by which processing is performed at the compositing mask generating unit 223.
Figure 10:
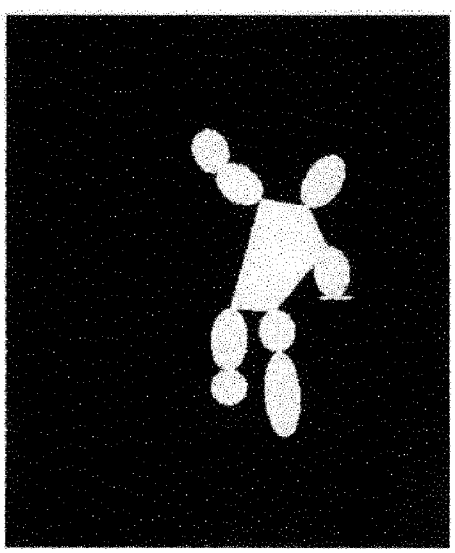

Operations of the compositing mask generating unit 223 will be described below with reference to FIG. 9. Note that FIG. 10 is a diagram illustrating the way by which processing is performed at the compositing mask generating unit 223.

In S224, the joint position acquiring unit 224 takes as input the composited image generated in S222, acquires joint positions of the person in the person region included in the composited image, and joint labels (e.g., right wrist, right elbow), and outputs the joint positions, the joint labels, and the composited image. Specifically, joint positions and joint labels are acquired using a joint model indicating a linkage relation of joint labels. For example, acquisition can be performed using openPose (see Reference Non-Patent Literature 1) (See FIG. 10(A)).
(Reference Non-Patent Literature 1: Realtime_Multi-Person_Pose_Estimation, [online], [searched May 23, 2018], Internet <URL: https://github.com/ZheC/Realtime_Multi-Person_Pose_Estimation>)

In S225, the person region generating unit 225 takes the composited image output in S224 and the joint positions and joint labels acquired in S224 as input, generates a compositing mask from a mask generating image using the joint positions and joint labels, and outputs the compositing mask and the composited image. Specifically, the aforementioned joint model is used to geometrically link joint positions of joints indicated by the joint labels, thereby generating a region representing a person on the composited image. This region is set to white, and all other regions of the composited image are set to black, thereby generating a compositing mask (see FIG. 10(B)). Geometrically linking here means processing of combining shapes (e.g., rectangles, ellipses, lines, curves) prepared in advance to match joint positions, in order to fit to the region representing the person.

In S226, the output unit 226 takes the composited image output in S225 and the compositing mask generated in S225 as input, generates composited learning data that is a set of the composited image and compositing mask, and outputs the generated composited learning data.

In S130, the learning unit 130 takes the trained model parameters recorded in the recording unit 190 and the composited learning data generated in S120 as input, learns (i.e., updates) the model parameters (region extraction model) using the composited learning data, and outputs the learned model parameters. Trained model parameters are used as the initial values of the model parameters at the time of learning.

Note that randomly-generated values may be used as the initial values of the model parameters, instead of using trained model parameters. In this case, there is no need for the recording unit 190 to record trained model parameters, and only the composited learning data generated in S120 is input to the learning unit 130.

According to the invention of the present embodiment, a region extraction model used for extracting a person region from an image can be learned using learning data generated while suppressing preparation costs.

(Modification 1)

A joint model is used in generating of the compositing mask at the composited learning data generating unit 220. An arrangement may be made where this joint model is used to define M(p) as a function that is a weight $w_p (0 < w_p \leq 1)$ determined for each pixel in the person region, and 0 for all other regions, and learning by the learning unit 130 is performed. Note that the learning unit 130 generates the function M(p) before beginning learning. For example, M(p) is defined such that the weight is 1 at pixels in a region linking the right wrist and the right elbow, and the weight is 0.7 at pixels in a region linking the right elbow and the right shoulder. Model parameter learning that reflects the degree of importance of body parts is enabled by the learning unit 130 learning model parameters using the weighted loss function $L_w(p)$ that uses M(p) with different weights for each pixel in the person region.

Third Embodiment

Figure 11:
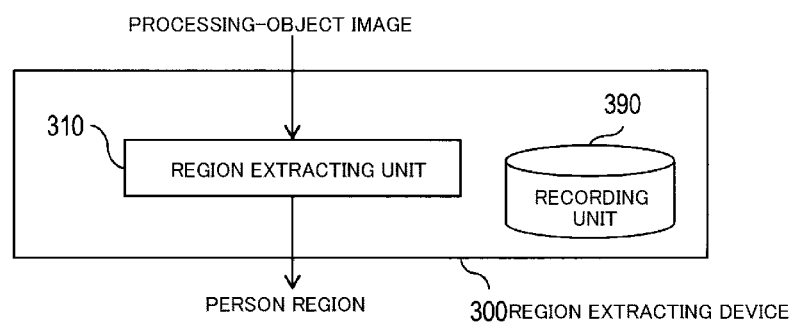
FIG. 11 is a block diagram illustrating a configuration of a region extracting device 300.
Figure 12:
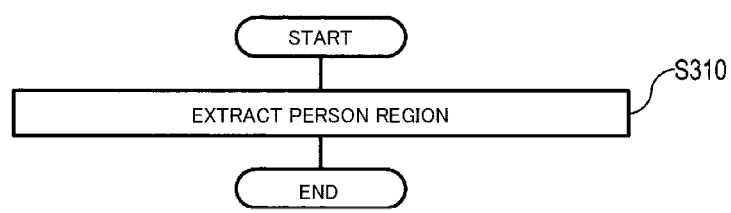
FIG. 12 is a flowchart illustrating operations of the region extracting device 300.

The region extracting device 300 will be described below with reference to FIG. 11 and FIG. 12. FIG. 11 is a block diagram illustrating a configuration of the region extracting device 300. FIG. 12 is a flowchart illustrating operations of the region extracting device 300. The region extracting device 300 includes a region extracting unit 310 and a recording unit 390, as illustrated in FIG. 11. The recording unit 390 is a component that records, as appropriate, information necessary for processing by the region extracting device 300. The recording unit 390 records, for example, model parameters that have been learned by the region extraction model learning device 100/200 (region extracting model).

Operations of the region extracting device 300 will be described below with reference to FIG. 12.

In S310, the region extracting unit 310 takes a processing-object image as input, extracts a person region included in the processing-object image using the model parameters recorded in the recording unit 390, and outputs the extracted person region. The processing-object image here is an image including a person region. Note that the background of the processing-object image preferably is the same as the background of the background image that the region extraction model learning device 100/200 used for learning, as described earlier.

According to the invention of the present embodiment, a person region can be extracted from an image that is an object of extracting processing with good precision.

<Notes>

The device according to the present invention, as a standalone hardware entity for example, has an input unit to which a keyboard or the like can be connected, and output unit to which a liquid crystal display or the like can be connected, a communication unit connectable to a communication device (e.g., communication cable) that can communicate externally from the hardware entity, a CPU (Central Processing Unit, may have cache memory, registers, etc.), RAM and ROM that are memory, an external storage device that is a hard disk, and a bus that connects the input unit, output unit, communication unit, CPU, RAM, ROM, and external storage device so as to be capable of exchanging data therebetween. A device (drive) that can read from and write to a recording medium such as a CD-ROM or the like, and so forth, may be provided to the hardware entity as necessary. Examples of physical entities having such hardware resources include a general purpose computer or the like.

The external storage device of the hardware entity stores programs necessary for realizing the above-described functions, and data and so forth necessary for processing of the programs (this is not limited to the external storage device, and programs may be stored in ROM that is a read-only storage device, for example). Data and so forth obtained by processing performed by these programs is stored in RAM, the external storage device, and so forth, as appropriate.

In the hardware entity, the programs stored in the external storage device (or ROM or the like) and data necessary for processing of the programs are read into memory as necessary, and subjected to interpreting processing by the CPU as appropriate. As a result, the CPU realizes predetermined functions (the components described above as so-and-so unit, so-and-so means, and so forth).

The present invention is not limited to the above-described embodiments, and modifications can be made as appropriate without departing from the essence of the present invention. Processing described in the above embodiments is not restricted to being executed in the order of the time sequence described therein, and may be executed in parallel or individually, in accordance with the processing capabilities of the device executing processing, or as necessary.

In a case of realizing the processing functions at the hardware entity (device of the present invention) described in the above embodiments by a computer, the contents of processing for the function which the hardware entity should have are described as a program, as mentioned earlier.

Executing this program on a computer realizes the processing functions of the above hardware entity on the computer.

The program describing these contents of processing can be recorded in a computer-readable recording medium. Any computer-readable recording medium may be used, such as magnetic recording devices, optical discs, opto-magnetic recording media, semiconductor memory, and so forth, for example. Specifically, examples of a magnetic recording device that can be used include hard disk devices, flexible disks, magnetic tape, and so forth. Examples of optical discs include DVD (Digital Versatile Disc), DVD-RAM (Random Access Memory), CD-ROM (Compact Disc Read Only Memory), CD-R (Recordable)/RW (ReWritable), and so forth, examples of opto-magnetic recording media include MO (Magneto-Optical disc) and so forth, and examples of semiconductor memory include EEP-ROM (Electronically Erasable and Programmable-Read Only Memory) and so forth.

Distribution of this program is performed by sales, transfer, lending, and so forth of a transportable recording medium such as a DVD, CD-ROM, or the like, in which the program is recorded, for example. Further, a configuration for distribution of the program may be made by storing the program in a storage device of a server computer, and transferring the program from the server computer to other computers via a network.

A computer that executes such a program first stores the program recorded in a transportable recording medium or the program transferred from a server computer in its own storage device to begin with, for example. Then, at the time of executing the processing, the computer reads the program stored in its own recording medium, and executes processing following the program that has been read out. As a separate form of executing the program, the computer may directly read the program from the transportable recording medium and execute processing following the program. Further, each time the program is transferred from the server computer to this computer, the computer may successively execute processing following the program that has been received. Also, a configuration may be made where the above-described processing is executed by a so-called ASP (Application Service Provider) type service, where the program is not transferred from the server computer to this computer, and the processing functions are realized just by instructions for execution and acquisition of results. Note that the program according to this form includes information used for processing by electronic computers that is equivalent to programs (data or the like that is not direct instructions to a computer but has a nature of defining processing of the computer).

Also, in this form, the hardware entity is configured by executing a predetermined program on a computer, but at least part of these contents of processing may be realized by hardware.

The invention claimed is:

1. A region extraction model learning device, comprising a processor configured to execute a method comprising:
receiving an image including a person region and a mask indicating the person region;
receiving a background image to serve as a background of a composited image;
generating compositing parameters, wherein the compositing parameters include:
an enlargement factor whereby the person region is enlarged/reduced relative to the image,
a degree of translation by which to translate the person region relative to the image, and
a degree of rotation by which to rotate the person region relative to the image,
using the mask;
extracting the person region from the image using the mask;
generating the composited image from the background image and the person region, using the compositing parameters,
generating, based on the compositing parameters, a compositing mask from a combination including the person region and a mask generating image, wherein the mask generating image is the same size as the composited image;
generating, based on a combination of the composited image and the compositing mask associated with the composited image, composited learning data; and
learning model parameters associated with a region extraction model using the composited learning data.

2. The region extraction model learning device of claim 1, the processor further configured to execute a method comprising:
generating the compositing mask from the mask generating image that is the same size as the composited image, using the composited image.

3. The region extraction model learning device according to claim 2, the processor further configured to execute a method comprising:
acquiring a joint position and a joint label of a person in the person region associated with the composited image; and
generating the compositing mask from the mask generating image, using the joint position and the joint label.

4. The region extraction model learning device according to claim 1,
wherein the learning of the model parameters comprises using a weighted loss function $L_w(p)$ $$Lw(P)=\alpha(1+M(p))L(p) \qquad \text{[Formula 1]}$$

where $L(p)$ is a loss function defined on the basis of error between a first person region extracted from a composited image and a second person region in a compositing mask using model parameters being learned, $M(p)$ is a function that is 1 in a person region and is 0 at all other regions, and $\alpha$ is a predetermined positive value.

5. The region extraction model learning device according to claim 2,
wherein the learning of the model parameters comprises using a weighted loss function $L_w(p)$ $$Lw(P)=\alpha(1+M(p))L(p) \qquad \text{[Formula 2]}$$

where $L(p)$ is a loss function defined on the basis of error between a person region extracted from a composited image and a person region in a compositing mask using model parameters being learned, $M(p)$ is a function that is 1 in a person region and is 0 at all other regions, and $\alpha$ is a predetermined positive value.

6. The region extraction model learning device according to claim 3,
wherein the learning of the model parameters comprises using a weighted loss function $L_w(p)$ $$Lw(P)=\alpha(1+M(p))L(p) \qquad \text{[Formula 3]}$$

where $L(p)$ is a loss function defined on the basis of error between a person region extracted from a composited image and a person region in a compositing mask using model parameters being learned, $M(p)$ is a function that is 1 in a person region and is 0 at all other regions, and α is a predetermined positive value.

7. A computer-implemented method for region extraction model learning, the method comprising:
receiving an image including a person region and a mask indicating the person region;
receiving a background image to serve as a background of a composited image;
generating compositing parameters, wherein the compositing parameters include:
an enlargement factor whereby the person region is enlarged/reduced relative to the image,
a degree of translation by which to translate the person region relative to the image, and
a degree of rotation by which to rotate the person region relative to the image,
using the mask;
extracting the person region from the image using the mask;
generating the composited image from the background image and the person region, using the compositing parameters;
generating, based on the compositing parameters, the compositing mask from a combination including the person region and a mask generating image, wherein the mask generating image is the same size as the composited image; and
generating, based on a combination of the composited image and the compositing mask associated with the composited image, composited learning data; and
learning model parameters associated with a region extraction model using the composited learning data.

8. The region extraction model learning method of claim 7,
wherein the generating composited learning data includes:
generating the compositing mask from the mask generating image that is the same size as the composited image, using the composited image.

9. The computer-implemented method of claim 8, the method further comprising:
acquiring a joint position and a joint label of a person in a person region included in the composited image; and
generating the compositing mask from the mask generating image, using the joint position and the joint label.

10. The computer-implemented method of claim 9,
wherein the learning of the model parameters comprises using a weighted loss function $L_w(p)$ $$Lw(P)=\alpha(1+M(p))L(p) \qquad \text{[Formula 9]}$$

where L(p) is a loss function defined on the basis of error between a person region extracted from a composited image and a person region in a compositing mask using model parameters being learned, M(p) is a function that is 1 in a person region and is 0 at all other regions, and α is a predetermined positive value.

11. The computer-implemented method of claim 8,
wherein the learning of the model parameters comprises using a weighted loss function $L_w(p)$ $$Lw(P)=\alpha(1+M(p))L(p) \qquad \text{[Formula 8]}$$

where L(p) is a loss function defined on the basis of error between a person region extracted from a composited image and a person region in a compositing mask using model parameters being learned, M(p) is a function that is 1 in a person region and is 0 at all other regions, and α is a predetermined positive value.

12. The computer-implemented method of claim 7,
wherein the learning of the model parameters comprises using a weighted loss function $L_w(p)$ $$Lw(P)=\alpha(1+M(p))L(p) \qquad \text{[Formula 7]}$$

where L(p) is a loss function defined on the basis of error between a person region extracted from a composited image and a person region in a compositing mask using model parameters being learned, M(p) is a function that is 1 in a person region and is 0 at all other regions, and α is a predetermined positive value.

13. The computer-implemented method of claim 7,
wherein the background image is distinct from the person region, wherein the person region includes one or more joints of a person for acquiring one or more joint labels, and wherein the one or more joint labels include a wrist and an elbow.

14. A computer-readable non-transitory recording medium storing computer-executable program instructions that when executed by a processor cause a computer to execute a method comprising:
receiving an image including a person region and a mask indicating the person region,
and receiving a background image to serve as a background of a composited image;
generating compositing parameters, wherein the compositing parameters include:
an enlargement factor whereby the person region is enlarged/reduced relative to the image,
a degree of translation by which to translate the person region relative to the image, and
a degree of rotation by which to rotate the person region relative to the image,
using the mask;
extracting the person region from the image using the mask;
generating the composited image from the background image and the person region, using the compositing parameters,
generating, using the compositing parameters, a compositing mask from a combination including the person region and a mask generating image, wherein the mask generating image is the same size as the composited image;
generating, based on a combination of the composited image and the compositing mask associated with the compositing image, composited learning data; and
learning model parameters associated with a region extraction model using the composited learning data.

15. The computer-readable non-transitory recording medium according to claim 14, the computer-executable program instructions when executed further causing the computer to execute a method comprising:
generating the compositing mask from the mask generating image that is the same size as the composited image, using the composited image.

16. The computer-readable non-transitory recording medium according to claim 15,
wherein the learning of the model parameters comprises using a weighted loss function $L_w(p)$ $$Lw(P)=\alpha(1+M(p))L(p) \qquad \text{[Formula 5]}$$

where L(p) is a loss function defined on the basis of error between a person region extracted from a composited image and a person region in a compositing mask using model parameters being learned, M(p) is a function that is 1 in a person region and is 0 at all other regions, and α is a predetermined positive value.

17. The computer-readable non-transitory recording medium according to claim 14, the computer-executable program instructions when executed further causing the computer to execute a method comprising:
   acquiring a joint position and a joint label of a person in the person region associated with the composited image; and
   generating the compositing mask from the mask generating image, using the joint position and the joint label.

18. The computer-readable non-transitory recording medium according to claim 17,
   wherein the learning of the model parameters comprises using a weighted loss function $L_w(p)$ $$Lw(P)=\alpha(1+M(p))L(p) \quad \text{[Formula 6]}$$

where $L(p)$ is a loss function defined on the basis of error between a person region extracted from a composited image and a person region in a compositing mask using model parameters being learned, $M(p)$ is a function that is 1 in a person region and is 0 at all other regions, and α is a predetermined positive value.

19. The computer-readable non-transitory recording medium according to claim 14,
   wherein the learning of the model parameters comprises using a weighted loss function $L_w(p)$ $$Lw(P)=\alpha(1+M(p))L(p) \quad \text{[Formula 4]}$$

where $L(p)$ is a loss function defined on the basis of error between a person region extracted from a composited image and a person region in a compositing mask using model parameters being learned, $M(p)$ is a function that is 1 in a person region and is 0 at all other regions, and α is a predetermined positive value.

20. The computer-readable non-transitory recording medium program according to claim 14,
   wherein the background image is distinct from the person region, wherein the person region includes one or more joints of a person for acquiring one or more joint labels, and wherein the one or more joint labels include a wrist and an elbow.

\* \* \* \* \*